United States Patent [19]
Fredriksen et al.

[11] Patent Number: 5,679,085
[45] Date of Patent: Oct. 21, 1997

[54] VEHICLE PROPULSION UNIT AND METHOD FOR CONTROLLING SAME

[75] Inventors: Nils Fredriksen; Detlev Brockschmidt, both of Harsewinkel, Germany

[73] Assignee: Claas KGaA, Harsewinkel, Germany

[21] Appl. No.: 627,570

[22] Filed: Apr. 4, 1996

[30] Foreign Application Priority Data

Apr. 5, 1995 [DE] Germany ............ 195 12 637.8

[51] Int. Cl.$^6$ .................................. F16H 59/26
[52] U.S. Cl. .......................... 475/76; 74/731.1
[58] Field of Search ............... 475/72, 74, 76; 74/731.1

[56] References Cited

U.S. PATENT DOCUMENTS

| | | |
|---|---|---|
| 3,913,419 | 10/1975 | Sale et al. |
| 4,311,066 | 1/1982 | Schuhmann .................. 475/76 |
| 4,355,509 | 10/1982 | Fulkerson et al. ............ 475/76 |

FOREIGN PATENT DOCUMENTS

| | | |
|---|---|---|
| 0 081 696 B1 | 6/1983 | European Pat. Off. |
| 0 195 452 A2 | 9/1986 | European Pat. Off. |
| 6603290 | 2/1967 | Germany. |
| 23 40 841 C2 | 3/1982 | Germany. |
| 37 35 246 A1 | 5/1988 | Germany. |
| 41 25 988 A1 | 1/1993 | Germany. |
| 41 31 572 A1 | 3/1993 | Germany. |

OTHER PUBLICATIONS

H. Hoffmann, Bensberg, W. Koenig, Bergisch–Gladbach, D. Zeus, Icking Entitled: Die Hydraulische Grenzlastregelung Eines Stufenlosen Hydrostatischeh Getriebes;Dec., 1976–6 pages.

Dipl.–Ing. U. Melchinger, Prof. Dr.–Ing. W. Poppy Entitled: Elektronisch Geregeltes Drei–Pumpen–System; Aug., 1988–5 pages.

*Primary Examiner*—Dirk Wright
*Attorney, Agent, or Firm*—Cummings & Lockwood

[57] ABSTRACT

A propulsion unit, preferably a propulsion unit for a utility vehicle, as well as a method for controlling same are disclosed. The propulsion unit comprises an engine, a transmission and a power take-off unit having a power take-off shaft. A first fraction of the engine output power is directed to the transmission, whereas a second fraction is directed to the power take-off shaft. At least one of the power fractions is detected by means of measuring units. The power fraction transmitted to the transmission is limited to a predetermined limit value. It is, therefore, possible to install a propulsion unit with an engine, the output power of which being higher than the admissible input power of the transmission.

22 Claims, 5 Drawing Sheets

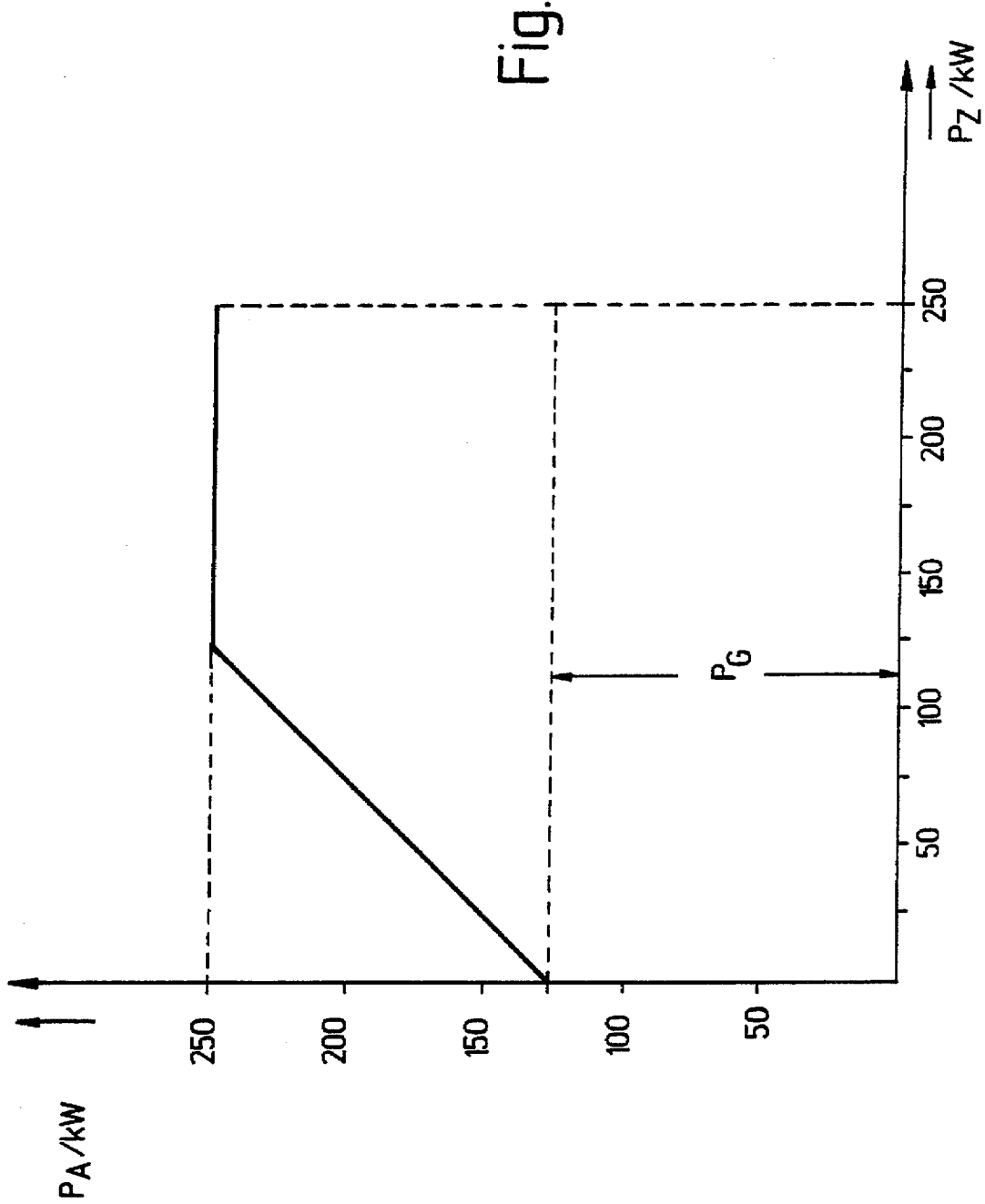

5,679,085

VEHICLE PROPULSION UNIT AND METHOD FOR CONTROLLING SAME

FIELD OF THE INVENTION

The invention relates to the field of propulsion units, in particular for vehicles. More specifically, the invention relates to a propulsion unit for a utility vehicle and to a method for controlling same.

BACKGROUND OF THE INVENTION

In the field of agricultural vehicles, such as tractors, it has been known to provide a so-called power take-off shaft in addition to the drive train for the vehicle wheels. The term power take-off shaft is used to describe a shaft stub arranged on a vehicle for directly driving attached implements, for example via detachable cardan shafts. The shaft stub usually is arranged at the rear or the front of the tractor.

The power take-off shaft normally is operated as live power take-off. With such arrangement, the power take-off shaft is driven directly by the tractor engine, normally via a power take-off clutch and, in certain cases, a separate power take-off transmission.

In the case of certain construction types, known as directional power take-offs, the power take-off shaft derives its power from the output of the vehicle drive, i.e. for example from the bevel pinion shaft at the input to the rear axle. In this case, the speed of the power take-off shaft is proportional to the vehicle speed.

Power take-off shafts are standardized in Germany under DIN 9611.

Supplementary implements, that are driven via power take-off shafts, especially agricultural implements, are gaining more and more in importance as the direct transmission of power from the tractor engine to the implement, via a power take-off shaft, results in a clearly higher efficiency than indirect power transmission by traction of the implement.

This has resulted in a need for tractors with ever higher engine power, in order to satisfy the power requirements of the drive on the one hand and the power requirements of the power take-off with power take-off shaft on the other hand.

On the other hand, the gearboxes of such vehicles may be operated only with a given maxim input power, depending on the particular design, if damage to the gearbox is to be avoided. Now, if the tractor engine is intentionally designed for a clearly higher power, for example with an installed diesel engine power of 300 kw, which is to be transmitted to the power take-off drive, maybe even in full, whereas the maximum power admissible for the vehicle drive is limited to 125 kW, then there is a risk that an excessive fraction of the diesel engine power of 300 kW may be transmitted to the vehicle drive.

Commercial vehicles of the kind of interest in the present case are normally equipped with a plurality of forward and reverse speeds, for example eight forward and eight reverse speeds. In the lower speed ranges, for example in the first to third speeds, no overloading of the gearbox will occur, as in such lower gears the wheels will start slipping in the presence of excessive power so that the power fraction transmitted by the gearbox will be limited automatically. In the higher speeds, beyond the slipping limit, however, the wheels will not slip so that the whole input power of the gearbox will be transmitted by the latter, regardless of whether an admissible maximum value set for the gearbox input power is exceeded or not.

In the prior art, hydrostatic/mechanical power transmissions have been used being of the split-power coupled planetary gearbox type comprising a continuously variable coupling gear stage. This type of transmissions is preferably used in utility vehicles. This type of transmission provides for power division between a hydrostatic transmission stage on the one hand and a planetary gearbox on the other hand. Such types of transmissions make it possible to run continuously, and without interruption of the tractive power, through a plurality of operating or drive ranges, for example eight in forward and eight in reverse direction.

In this case, when the transmission power is kept constant, the pressure curves run through in each drive range in the hydrostatic transmission have the shape of a hyperbola.

In the case of a commercially available transmission of that type, the high pressure in the hydrostatic transmission, for example at the beginning of a drive range, is 330 bar, in the middle 200 bar, and at the end 198 bar, related for example to a power of 125 kW transmitted by the transmission.

Now, it is the object of the present invention to improve a propulsion unit and method of the before-described kind so as to protect the transmission from excessive input power. This is to enable a drive engine of practically any desired power to be installed in the propulsion unit so that the power take-off can be supplied with high fractions of the engine output power, whereas it is to be ensured on the other hand that the power fraction transmitted at any time to the transmission will safely remain below a maximum value set by the particular transmission rating.

SUMMARY OF THE INVENTION

The invention encompasses a propulsion unit comprising:
an engine generating an output power;
a transmission having an input and an output for driving vehicle wheels;
a power take-off unit having a power take-off shaft;
a distributor for distributing the output power between the transmission input and the power take-off unit such that a first fraction of the output power is a directed to the transmission input wherein a second fraction of the output power is directed to the power take-off unit;
a measuring stage for measuring at least one of the power output fractions, the measuring stage generating an output signal;
a limiting stage for limiting the first power output fraction in response to the output signal.

The invention, further, encompasses a method for controlling a propulsion unit of the kind mentioned above and comprising the steps of:
measuring at least one of the output power fractions; and
limiting the first output power fraction to a predetermined limit value.

The object underlying the present invention is thereby achieved fully and perfectly. For, it is now possible for the first time to rate the engine power to be installed without having to give consideration to the maximum input power permissible for the transmission. Instead, almost any engine power can now be installed. This makes it possible to operate through the power take-off even additional units that have a power consumption much higher than was previously allowed with prior art propulsion units. Given the fact that power take-off drives are progressively gaining in importance as it is desirable, for cost reasons, to operate as many supplementary units as possible with a single propulsion unit, for example on a tractor, the economic effects are also quite considerable. It is thus possible, with the aid of the invention, to operate the supplementary units at a very high and constant power, without having to give consideration to the particular traveling operation. In contrast to conventional propulsion units, where the output of the power take-off was limited by the installed engine power, the invention now enables the supplementary units attached to the power take-off to be operated at full power, even under conditions of high power consumption of the vehicle drive.

In the case of a first group of embodiments of the invention ("pressure" approach) the transmission is designed, at least in part, as a hydrostatic transmission stage. The measuring units comprise a pressure sensor for the high pressure in the hydrostatic transmission stage and means for detecting the transmission ratio of the transmission.

This feature provides the advantage that the pressure measuring system can be implemented in a hydrostatic transmission in a relatively simple way and at low cost. In addition, it is an advantage of this arrangement that the pressure measuring signal can be used at the same time for optimizing the switching processes in the transmission. This "pressure approach" is particularly easy to implement and can be employed for limiting the power directly in the transmission.

However, in cases where the transmission is designed, at least in part, as a hydrostatic transmission stage it is particularly preferred if the limiting means comprise an actuator for the transmission ratio of the hydrostatic transmission stage. By adjusting the transmission ratio of the hydrostatic transmission stage it is then possible to adjust or limit the power fraction transmitted to the transmission.

This feature provides the advantage that only that fraction of the entire power which is transmitted to the transmission will be limited by the propulsion unit. Thus, the power fraction not transmitted to the transmission is available in full for use by the auxiliary drive and the power take-off shaft.

This is true in particular when the transmission is of the split-power coupled planetary gearbox type comprising the hydrostatic transmission stage as a continuously variable coupling gear stage, wherein, further, the hydrostatic transmission stage, for not exceeding a predetermined threshold value of the first power output fraction, is operated along a predetermined high pressure curve for each drive range, the limiting stage comprising a controller for limiting the actual high pressure value to the high pressure curve value.

This feature provides the advantage that it is now possible, with a transmission of the described design, to implement the desired power limitation in the transmission line with only very simple additional measures and simple action oh the transmission control.

It is only necessary for this purpose to lay down in the transmission control program, as limit curve, the before-mentioned hyperbolic pressure curves representing in each drive range a given constant transmission power, i.e. the desired limit value. This curve can then be shifted with the aid of a factor in Y direction, the choice of the factor allowing for the admissible power and the efficiency ratio.

It is then possible, by a simple pressure measurement, to detect any situation where the predetermined pressure curve is exceeded and to correct any such situation by suitable action on the transmission ratio. The vehicle will then travel at reduced speed until it is detected that the high pressure is again within its admissible range.

Determining and/or limiting the power in a commercially available transmission of this design, by measuring the high pressure in the hydrostat, provides the advantage that only very slight changes have to be applied the existing transmissions. The only requirement is to install a high pressure sensor in a suitable position in the hydrostat. The pressure signal of the sensor is processed in the control unit and employed for controlling the transmission. All control processes take place exclusively in the area of the transmission and are covered by corresponding software supplements. There is no need for any action on the drive engine.

In the case of a second group of embodiments of the invention ("torque approach") the measuring units comprise a speed pickup and a torque pickup on a shaft transmitting one of the output power fractions. The speed and the torque are measured at that shaft.

This feature provides the advantage that the power fraction can be derived in a particularly simple way from the speed and the torque, by the use of conventional sensor systems. Normally, use can be made for this purpose of sensors, especially speed sensors, that are anyway present in the drive unit for the purposes of conventional drive and transmission controls. By simply computing the product of the torque and speed values, one then obtains the power fraction transmitted by the respective shaft. This "torque approach" requires some action on the electronic control of the drive engine.

According to a preferred further improvement of this embodiment of the invention, the shaft is the power take-off shaft.

This feature provides the advantage that the power take-off shaft is normally easily accessible, because the power take-off shaft extends from the engine output in parallel to the transmission, or is coupled at the transmission input and extends through the transmission in parallel to the transmission stages. With this arrangement, it is possible with simple constructional means to arrange for example an increment pickup, especially a toothed wheel or the like, and a torque pickup on the power take-off shaft.

Determining the transmitted power fraction by measuring the torque and speed further provides an additional advantage under safety aspects. For, if the related signal should fail, this tells the drive control that no power is transmitted to the power take-off shaft so that the drive engine will continue to operate at half throttle. Compared with other ways of detecting measuring data, this provides the advantage that no false signals occur which would indicate wrongly that the traveling drive is in its no-load condition and which would then release the full engine power with the consequence that the transmission may be overloaded or even destroyed.

In the case of a third group of embodiments of the invention ("force approach") the measuring units comprise a force pickup for measuring the reaction torque of the transmission relative to a stationary chassis, and means for detecting the transmission ratio of the transmission. The reaction torque and the transmission ratio are measured and then evaluated.

This measure provides the advantage that the reaction torque of the transmission case relative to the chassis can be detected for example by means of a force transducer, and the transmission input power can be computed by relating it to the respective transmission ratio.

According to a preferred variant of the invention, the output power of the engine is limited by means of a power controller.

The power controller may, for example, be an injection pump, especially a diesel injection pump with electronic control.

Other advantages will become apparent from the following specification and the attached drawing.

It is understood that the features mentioned above and those yet to be explained below can be used not only in the respective combinations indicated, but also in other combinations or in isolation, without leaving the scope of the present invention.

BRIEF DESCRIPTION OF THE DRAWINGS

One embodiment of the invention is illustrated in the drawing and will be described hereafter in more detail. In the drawings:

FIG. 5 shows a diagram of the output of the diesel engine of the drive unit as a function of the power output of the power take-off shaft.

DESCRIPTION OF THE PREFERRED EMBODIMENTS

Figure 1:
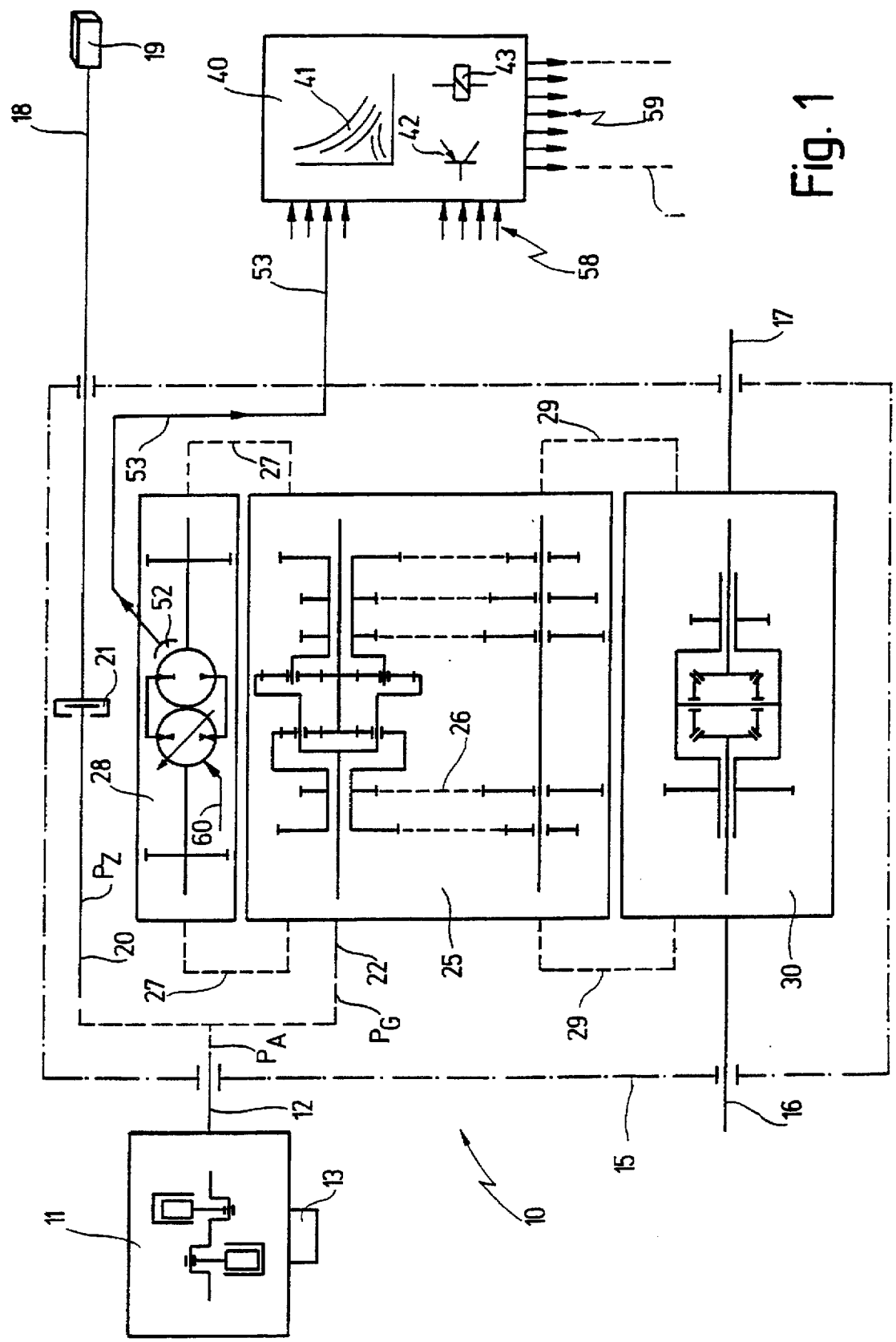
FIG. 1 shows a schematized block diagram of a first embodiment of a drive unit according to the invention, embodying a "pressure approach"

In FIG. 1, a drive or propulsion unit of the kind preferably used for driving agricultural utility vehicles, but also for driving municipal service vehicles, road construction vehicles, busses, trucks, etc., is generally indicated by reference numeral 10.

The drive unit 10 comprises a drive engine 11, preferably a diesel engine. The drive engine 11 has a maximum power output of, for example, 300 kW.

The drive engine 11 comprises an engine shaft 12. It is operated via an injection pump, preferably a diesel injection pump 13.

The engine shaft 12 communicates with a transmission of the split-power coupled planetary gearbox type (in German: "Stellkoppelgetriebe"), designated generally by reference numeral 15. Transmissions of this kind are disclosed, for example, in European patent specification 0 081 696, European disclosure document 0 195 452, German disclosure document 41 25 988 and German disclosure document 41 31 572, all of these patent publications or their U.S. equivalents, respectively, being incorporated herein by reference.

At the output of the coupled transmission with control function 15, a rear axle 17 and a front axle 16 are indicated. Further, there is provided a power take-off shaft 18 serving as auxiliary drive. The power take-off shaft 18 comprises a shaft stub 19 for the attachment of supplementary implements. The power take-off shaft 18 is substantially designed as straight-through shaft 20 in the coupled final-control transmission 15. Included in the straight-through shaft 20 is a power take-off clutch 21 by means of which the power take-off can be switched on and off.

The engine power $P_A$ at the engine shaft 12 is divided in the transmission 15, as indicated by broken lines, into a power fraction $P_Z$ for the power take-off shaft 18 and a power fraction $P_G$ for a transmission input shaft 22.

The transmission input shaft 22 serves a planetary/spur-gear unit 25, where a planetary gearing coacts with a spur-gear unit, as indicated by broken lines 26. The planetary gearing/spur-gear unit 25 coacts with a hydrostatic transmission 28 via connections 27. The output power is transmitted to the rear axle 17 and the front axle 16 via a differential gear 30 and via further connections 29.

The operation of such a coupled split-power final-control transmission is described in detail by the documents listed above. Insofar it has to be noted in the present connection that such a transmission permits, at substantially constant speed of the drive engine 11 at its power optimum or consumption minimum, a plurality of traveling ranges to be run through continuously, each in forward and reverse direction, and this without any interruption of the tractive force. During this action, the power is divided between the hydrostatic transmission 28 and the planetary gearing/spur-gear unit 25. In each traveling range, the hydrostatic transmission runs from a pressure maximum down to a pressure minimum along a hyperbolic curve, as will be explained in more detail below, in connection with FIG. 4.

A transmission control 40 serves for controlling the transmission 15.

Different characteristics 41 are stored in the transmission control 40, and electronic units 42 as well as fluid-dynamical units, such as electromagnetic valves 43, are actuated in order to take action on the elements of the transmission 15.

According to the "pressure approach" illustrated in FIG. 1, a pressure sensor 52 is provided for detecting the high pressure p in the hydrostatic transmission 28. The measured value is transmitted to the transmission control 40 via first signal line 53.

Figure 2:
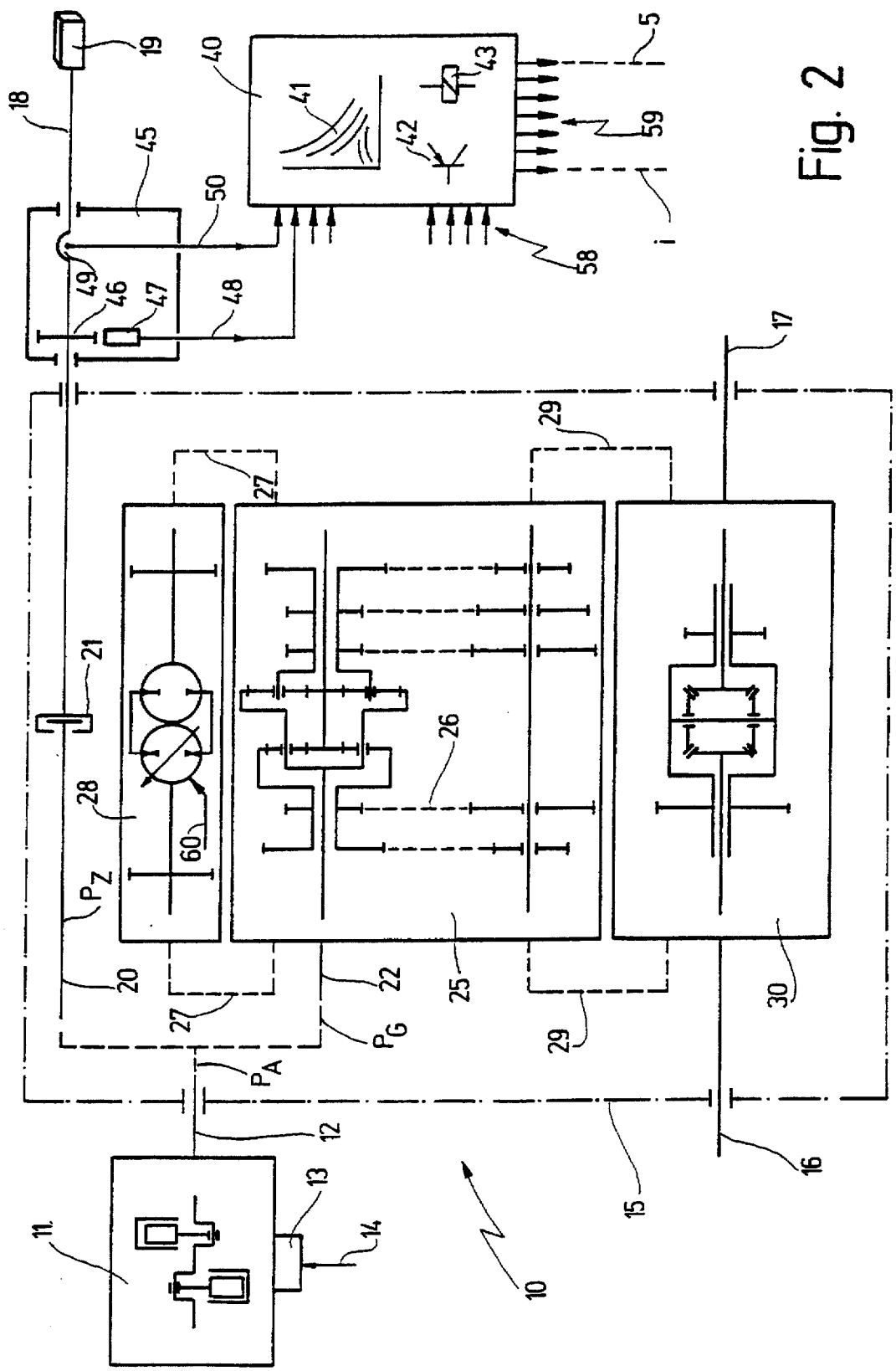
FIG. 2 shows a schematized block diagram similar to FIG. 1, but of a second embodiment of a drive unit according to the invention, embodying a "torque approach"

According to the second embodiment of a "torque approach", as illustrated in FIG. 2, a measuring device 45 is arranged out he power take-off shaft 18. The measuring device 45 comprises an increment pick-up 46, for example a toothed wheel rotating together with the power take-off shaft 18, or the like. A sensor 47 is associated with the increment pickup 46. This makes it possible to detect the rotary speed of the power take-off shaft 18. A first signal line 48 transmits the speed signal to the transmission control 40.

The measuring device 45 further comprises a torque pick-up 49. The torque pick-up 49 furnishes a signal corresponding to the torque transmitted by the power take-off shaft 18, which signal is transmitted to the transmission control 40 via a second signal line 50.

Action can be taken on the control of the diesel injection pump 13 by means of a third signal line 14.

Figure 3:
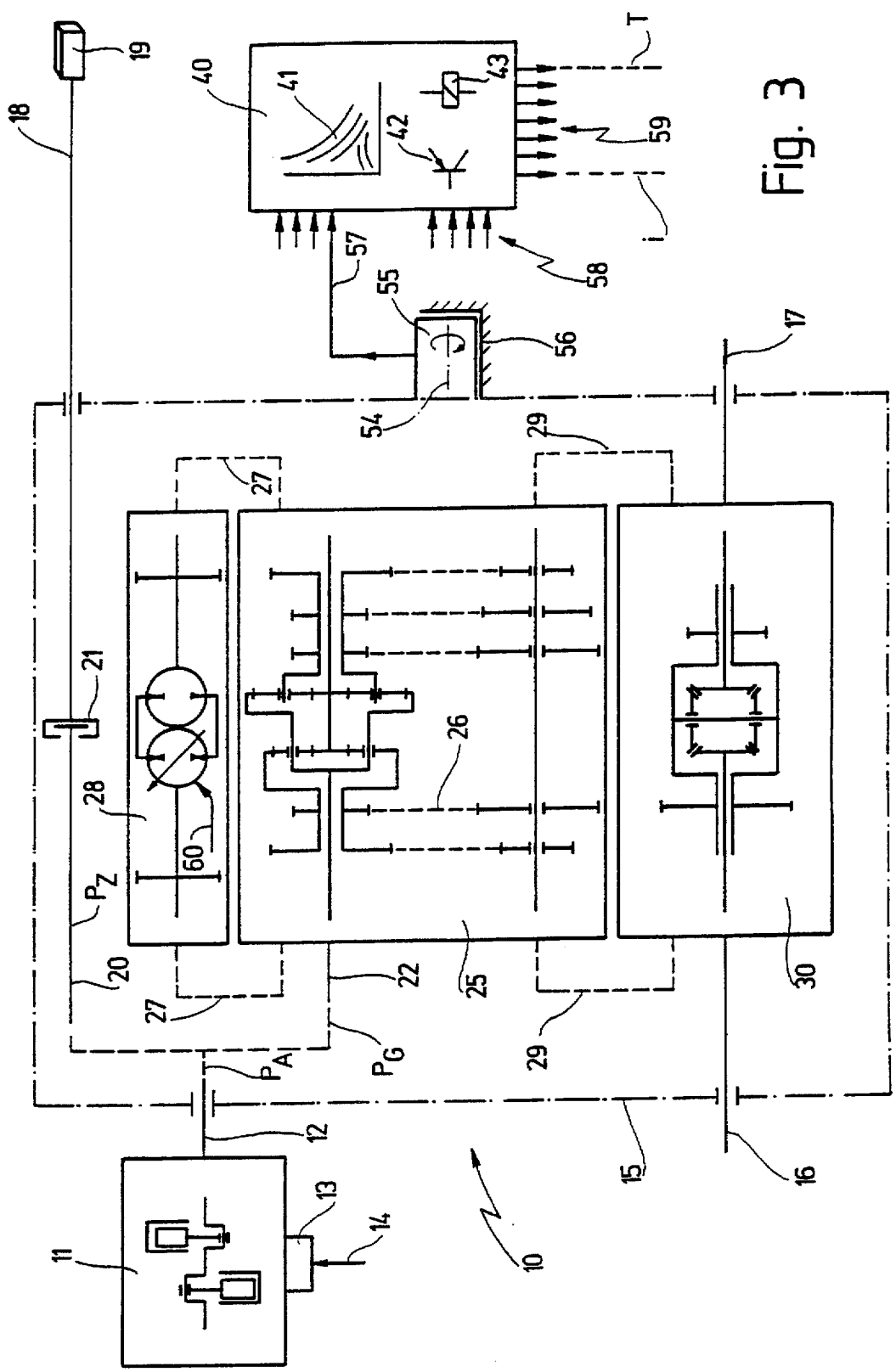
FIG. 3 shows a schematized block diagram similar to FIG. 1, but of a third embodiment of a drive unit according to the invention, embodying a "force approach"

The transmission 15 comprises a transmission shaft indicated by 54. According to the second variant of a "torque approach", as illustrated in FIG. 3, the supporting moment of the transmission 15 relative to a stationary chassis 56 can be detected by a force pickup 55, for example a force transducer. A signal corresponding to the supporting moment is transmitted to the transmission control 40 via a forth signal line 57.

Reference numeral 58 designates further signal lines 58, through which other suitable measuring signals can be transmitted to the transmission control 40.

Correspondingly, a plurality of output lines 59 are provided on the transmission control 40, for transmitting control signals, supplied by the electric system 42 or the electromagnetic valves 43, to the corresponding units of the drive unit 10. It is thus possible, for example, to adjust the transmission ratio i of the transmission 15 or of the hydrostatic transmission 28. Or else action can be taken on the drive engine 11, for example by adjusting the duration T of the injection pulses in the diesel injection pump 13 and, thus, the output power of the drive engine 11.

With the aid of the measuring elements described above, it is possible to detect the power fractions $P_Z$ and $P_G$ on the power take-off shaft 18 and the transmission input shaft 22, respectively. Such detection is possible, for example, by multiplying the speed signal by the torque signal present on the lines 48, 50, respectively. One thereby arrives at the power $P_Z$ transmitted via the power take-off shaft 18. When the drive power $P_A$ of the drive engine 11 is known, it is then possible, by forming the difference, to derive at the power fraction $P_G$ transmitted via the transmission 15.

In FIG. 5, the drive power $P_A$ is represented as a function of the power take-off output $P_Z$ for one embodiment of the invention, where the maximum drive power $P_A$ is 250 kW, whereas the maximum power permissible in the traveling train is 125 kW.

It will be noted from the diagram that the auxiliary drive output increases along a linear line from 125 kW to the final value of 250 kW, and then remains at this level until the maximum value of 250 kW available at the power take-off shaft is reached. The power fraction of the traveling drive is indicated by the double arrow $P_G$. It will be appreciated from FIG. 5 that the transmission and/or the diesel engine must be controlled in response to the traveling drive power and the power take-off output. As long as the traveling drive power is not utilized in full, the diesel engine may furnish a higher power output which can then be used for work on the power take-off shaft.

Corresponding computations are possible on the basis of the high pressure p, in combination with the transmission i, etc.

After the power fraction $P_G$ transmitted to the transmission 15 is known, suitable measures can be taken to prevent overloading of the transmission 15.

If, for example, the drive engine 11 has a maximum output power of 300 kW, as mentioned before, whereas the transmission 15 is designed for a power of 125 kW only and the remaining 175 kW are to be transmitted through the power take-off shaft 18, it must be ensured that no more than the before-mentioned 125 kW of the power output of the diesel engine of 300 kW will be transmitted to the transmission 15 as power fraction $P_G$.

Now, when it is determined by the transmission control 40, with the aid of the described signal evaluation, that the limit value for $P_G$, being 125 kW, is exceeded, then corresponding measures must be taken. These measures may consist of taking action on the drive engine 11, or else of reducing the power consumption of the transmission 15 as such. In the case of certain transmission designs, these safety measures may be limited to the higher speeds or traveling ranges, because in the lower speeds and traveling ranges the power is automatically limited in the transmission 15 due to the fact that the traveling wheels will start spinning, being not capable in these low-ratio speeds or traveling ranges to transmit a corresponding power to the ground.

Figure 4:
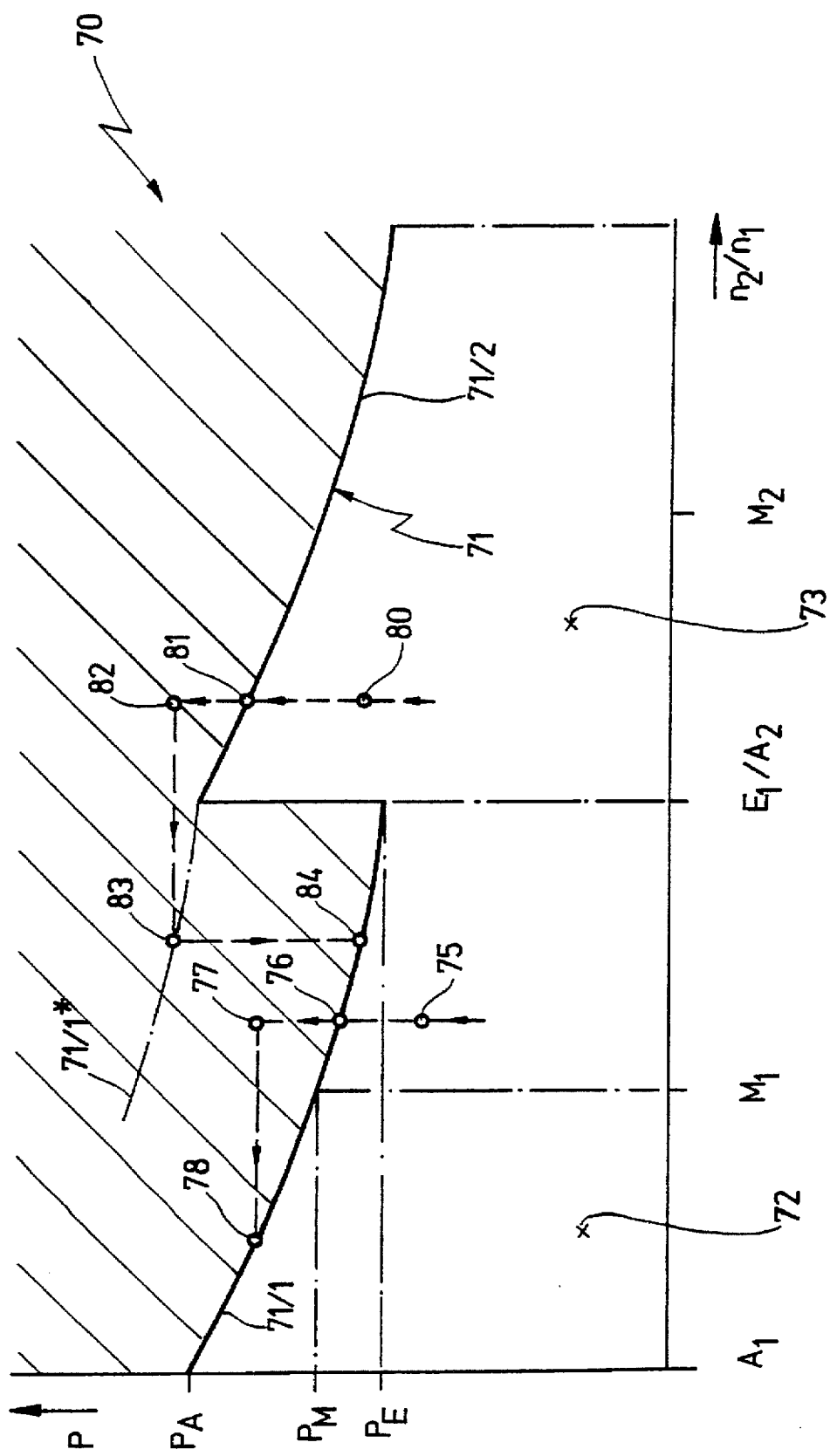
FIG. 4 shows a diagram illustrating the action of the drive units according to FIGS. 1 to 3.

FIG. 4 illustrates a particularly preferred procedure of limiting the power fraction $P_G$ transmitted to the transmission 15, by monitoring and adjusting the high pressure p in the hydrostatic transmission 28

FIG. 4 shows a corresponding diagram 70, illustrating a pressure curve 71 for the high pressure p as a function of the speed ratio $n_2/n_1$ at the output or input of the hydrostatic transmission 28. The diagram 20 represents two traveling ranges 72 and 73 out of a greater number of such traveling ranges.

It will be appreciated that the pressure curve 71 is identical in the two traveling ranges 72, 73, as indicated by 71/1 in the traveling range 72 and 71/2 in the traveling range 73. The pressure curve 71 follows in both cases the shape of a hyperbola, starting at a high initial pressure $P_A$ at the starting point $A_1$ or $A_2$ of a traveling range 72 or 73, respectively, followed by a medium pressure $P_M$ at the middle $M_1$ or $M_2$, respectively, and ending by a final pressure $p_E$ at the end $E_1$ of the traveling ranges 72 and 73, respectively.

In the before-mentioned example of a commercially available transmission with a maximum power transmission of $P_G$=125 kW one obtains, for example, the following values: $P_A$=330 bar, $P_M$=248 bar and $P_E$=198 bar.

Regarding now the example illustrated in the first traveling range 72, the following can be noted:

It is assumed that the transmission is initially operated at a working point 75 below the pressure curve 71/1. Thus, the high pressure p measured is lower than the permissible high pressure. Consequently, no special measures of the kind sought by the present invention need to be taken.

Now, when the high pressure p increases, as a result of an increase of the load, the working point will shift over 76 to 77, and thereby beyond the pressure curve 71/1. Thus, the high pressure measured is higher than the permissible high pressure. The transmission control 40 then changes the transmission ration i in the transmission 15 independently of the position of the hand throttle, with the consequence that the drive unit 10 and the driven vehicle will loose speed. When the speed of the vehicle has dropped to a point where the high pressure p at the working point 78 has fallen to within the admissible range, the control will be deactivated. As the high pressure p continues to drop, the vehicle speed can be increased again, in accordance with the predetermined position of the hand throttle.

The procedure illustrated by the working points 75 to 78 in FIG. 4 could make use, for control purposes, of the measure of reducing the vehicle speed via the transmission ratio at constant high pressure p, as illustrated by the profile between the working points 77 and 78, until the pressure profile 71/1 was crossed again at 78.

Now, when such a situation occurs within the initial portion of a traveling range, then additional precautionary measures become necessary. This situation is illustrated in the right half of FIG. 4, in the second working range 73.

Here again, the starting situation is an admissible working point 80 which then, as the load increases, shifts to a working point 81 located on the pressure curve 71/2. Once the working point 82 above the limit value 81 has been reached, the control system, coming to intervene, effects again a reduction of the vehicle speed and/or of the transmission ratio at constant high pressure p. However, the working curve, shown in broken lines and extending horizontally in this case, would in this case not reach the actually existing pressure profile 71/2 because a change of the traveling range will occur at $E_1/A_2$, shortly below the value assumed in this case for $n_2/n_1$, so that the pressure curve 71/2 drops at this point by an abrupt step.

It is, therefore, necessary in this case to extrapolate the pressure profile 71/2 of the second working range 73 below the starting point $A_2$, as indicated by the dash-dotted line 71/1* in FIG. 4. This is done by displacing the curve 71/1 in the first working range 72 in ordinate direction, by the amount of the abrupt change occurring at $E_1/A_2$. In this way, a theoretical working point 83 is found, corresponding to the real working point 84. The safety measure therefore comprises in this case a change of the traveling range.

We claim:

1. A propulsion unit comprising:
   an engine generating an output power;
   a transmission having an input and an output for driving vehicle wheels;
   power take-off means having a power take-off shaft;
   means for distributing said output power between said transmission input and said power take-off means such that a first fraction of said output power is directed to said transmission input whereas a second fraction of said output power is directed to said power take-off means;
   means for measuring at least one of said power output fractions, said measuring means generating an output signal; and
   means for limiting said first power output fraction in response to that output signal.

2. The unit of claim 1, wherein said transmission is at least in part configured as a hydrostatic transmission stage having a high pressure section, said measuring means comprising a pressure sensor for detecting high pressure within said high pressure section and means for detecting the transmission ratio of said transmission.

3. The unit of claim 1, wherein said transmission is at least in part configured as a hydrostatic transmission stage, said limiting means comprising an actuator element for setting the transmission ratio of said hydrostatic transmission stage.

4. The unit of claim 3, wherein said transmission is of the split-power coupled planetary gearbox type comprising said hydrostatic transmission stage as a continuously variable coupling gear stage, wherein, further, said hydrostatic transmission stage, for not exceeding a predetermined threshold value of said first power output fraction, is operated along a predetermined high pressure curve for each drive range, said limiting means comprising control means for limiting the actual high pressure value to the high pressure curve value.

5. The unit of claim 4, wherein said control means are adapted to change the transmission ratio for reducing an output speed of said transmission when said actual high pressure value is above said predetermined high pressure curve, until said actual high pressure value falls again below said predetermined high pressure curve.

6. The unit of claim 1, wherein said measuring means comprise a speed sensor and a torque sensor on as haft transmitting one of said output power fractions.

7. The unit of claim 6, wherein said shaft is said power take-off shaft.

8. The unit of claim 1, wherein said measuring means comprise a force sensor for measuring reaction torque of said transmission relative to a stationary chassis and means for detecting the transmission ratio of said transmission.

9. The unit of claim 6, wherein said limiting means comprise a power control for said engine.

10. The unit of claim 9, wherein said power control comprises an injection pump.

11. The unit of claim 10, wherein said injection pump is a diesel injection pump.

12. A utility vehicle having a propulsion unit comprising:
    an engine generating an output power;
    a transmission having an input and an output for driving vehicle wheels;
    power take-off means having a power take-off shaft;
    means for distributing said output power between said transmission input and said power take-off means such that a first fraction of said output power is directed to said transmission input whereas a second fraction of said output power is directed to said power take-off means;
    means for measuring at least one of said power output fractions, said measuring means generating an output signal; and
    means for limiting said first power output fraction in response to that output signal.

13. A method for controlling a propulsion unit having:
    an engine generating an output power;
    a transmission having an input and an output for driving vehicle wheels;
    power take-off means having a power take-off shaft; and
    means for distributing said output power between said transmission input and said power take-off means such that a first fraction of said output power is directed to said transmission input whereas a second fraction of said output power is directed to said power take-off means,
    wherein said method comprises the steps of:
    measuring at least one of said output power fractions; and
    limiting said first output power fraction to a predetermined limit value.

14. The method of claim 13, wherein, in the case of a transmission configured at least in part as a hydrostatic transmission stage, the step of measuring comprises measuring the high pressure in said hydrostatic transmission stage and measuring the ratio of said transmission.

15. The method of claim 13, wherein, in the case of a transmission configured at least in part as a hydrostatic transmission stage, the step of limiting comprises limiting said first output power fraction by adjusting the transmission ratio of said hydrostatic transmission stage.

16. The method of claim 15, wherein, in the case of a transmission being of the split-power coupled planetary gearbox type comprising said hydrostatic transmission stage as a continuously variable coupling gear stage wherein, further, said hydrostatic transmission stage, for not exceeding a predetermined threshold value of said first output power fraction, is operated along a predetermined high pressure curve for each drive range, said step of limiting comprises limiting the actual high pressure value to the high pressure curve value.

17. The method of claim 16, wherein, when said actual high pressure value is above said predetermined high pressure curve, the transmission ratio is changed for reducing output speed of said transmission until said actual high pressure value falls again below said predetermined high pressure curve.

18. The method of claim 13, wherein said step of measuring comprises measuring speed and torque on shafts transmitting said output power fractions.

19. The method of claim 18, wherein speed and torque are measured at said power take-off shaft.

20. The method of claim 13, wherein said step of measuring comprises measuring reaction torque of said transmission relative to a stationary chassis and measuring the transmission ratio of said transmission.

21. The method of claim 18, wherein said first output power fraction is limited by power-controlling said engine.

22. The method of claim 21, wherein said engine is controlled by acting on an injection pump of said engine.

* * * * *